May 12, 1970     E. J. HANSON     3,512,080
ELECTRICAL CONDUCTIVITY TESTER FOR MILK WITH MOVABLE
ELECTRODE FOR TEMPERATURE COMPENSATION
Filed June 9, 1967

Inventor
Emil J. Hanson
By Wheele, Wheele, House & Clemency
Attorneys

United States Patent Office 3,512,080
Patented May 12, 1970

3,512,080
ELECTRICAL CONDUCTIVITY TESTER FOR MILK WITH MOVABLE ELECTRODE FOR TEMPERATURE COMPENSATION
Emil J. Hanson, 2340 W. Marne, Glendale, Wis. 53209
Filed June 9, 1967, Ser. No. 644,834
Int. Cl. G01r 27/22
U.S. Cl. 324—30
2 Claims

ABSTRACT OF THE DISCLOSURE

Disclosed herein is a liquid testing device having a pair of electrodes positioned in a spaced relation within a reservoir and connected to an electrical circuit including an electrical conductivity indicating meter. One of said electrodes is mounted for movement in the reservoir relative to the other electrode and relative to the temperature scale on a thermometer positioned to respond to the temperature of the liquid in the reservoir.

BACKGROUND OF THE INVENTION

This application relates to a liquid testing device for determining whether the electrical conductivity of a liquid is normal or abnormal at predetermined conditions and is more particularly directed to an improvement in the means for adjusting the device to variations in temperature of the liquid to be tested. It is well known that the electrical conductivity of a liquid such as milk can be used as the basis for determining whether the milk is normal or abnormal. It is also known that the electrical conductivity of the same liquid will vary directly as the temperature of the liquid varies. With this generally known information a number of devices have been developed to test for abnormal milk by passing a direct current through a sample of the liquid and determining whether the electrical conductance of the sample is within a predetermined acceptable range. These devices generally require that the temperature of the liquid be first taken and an adjustment then be made in the distance between the electrodes in the sample. These devices also are for the most part difficult to clean and to adjust.

SUMMARY OF THE INVENTION

In the present application a pair of electrodes are positioned within an elongate reservoir mounted in a fixed position on a housing. A thermometer is positioned in a parallel relation to the reservoir with the bulb of the thermometer extending into the reservoir to respond immediately to the temperature of the liquid as it is poured into the reservoir. One of the electrodes is movable relative to the other electrode to increase or decrease the space between the electrodes according to the temperature of the liquid sample in the reservoir. One end of the movable electrode is used as a reference point and is aligned with the temperature scale on the thermometer. The two electrodes are electrically connected to a resistance type bridge circuit which includes a meter to indicate the conductivity of the sample. One of the resistances in the bridge circuit is adjustable and is preset to adjust the circuit prior to shipment from the factory. The current path through the sample forms another of the resistances in the bridge circuit and any variation of the conductivity of the sample will be immediately indicated on the meter. After a sample of milk is poured into the reservoir, the temperature will be noted and the reference end of the movable electrode moved into alignment at that point on the temperature scale indicating the temperature of the sample.

Other objects and advantages of the present invention will become more readily apparent from the following detailed description when read in connection with the accompanying drawings in which.

Figure 1:
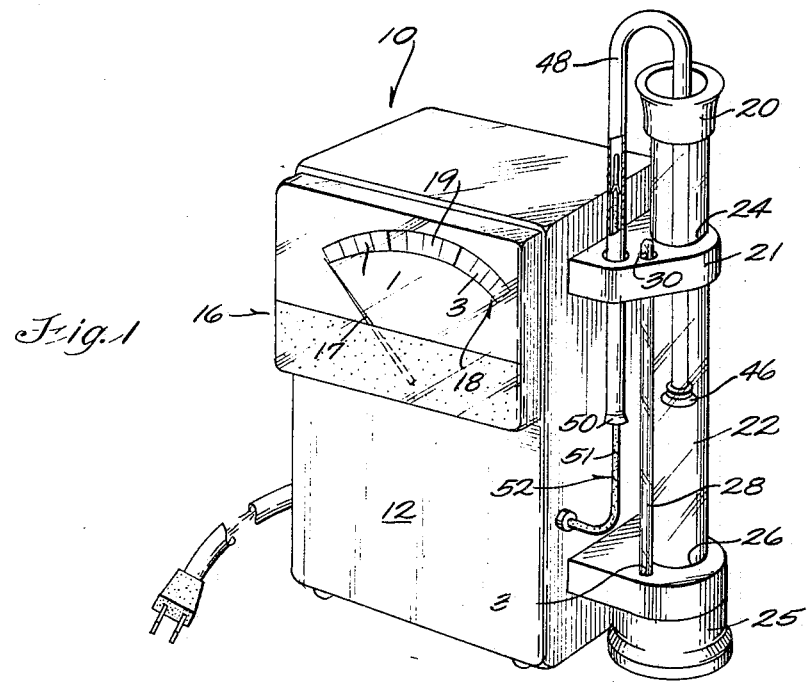
FIG. 1 shows a perspective view of the milk testing device.
Figure 2:
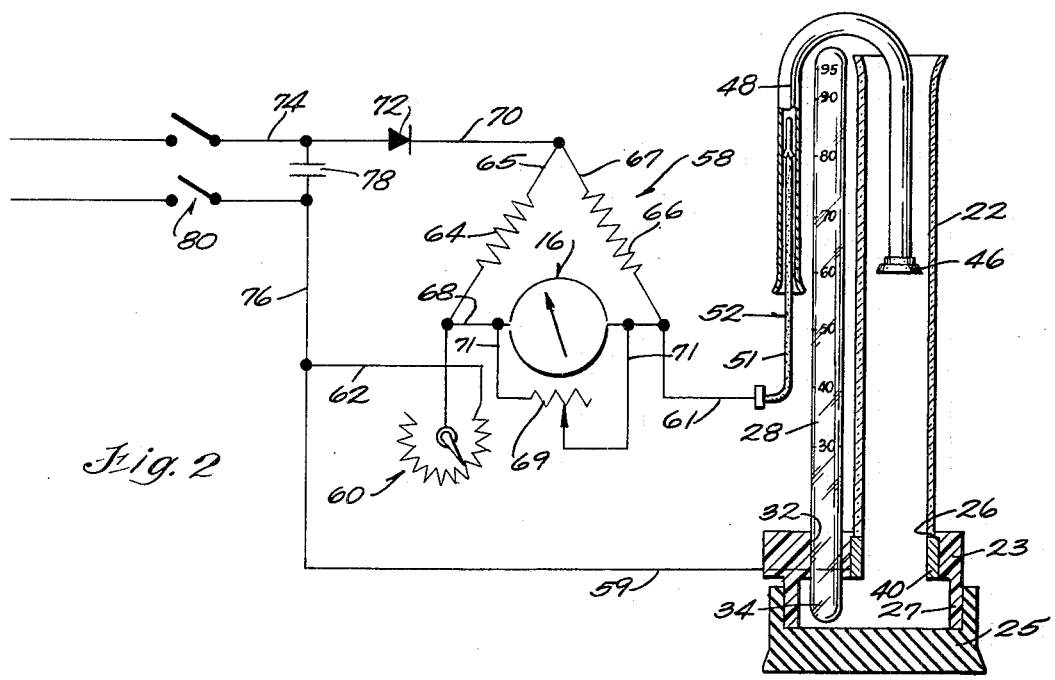
FIG. 2 is a circuit diagram embodied in the device.

Referring to the figures in the drawing, the improved milk testing device 10 includes a housing 12 having a conductivity meter 16 mounted on the face of the housing with a needle 17 movable over an indicia 18. The indicia 18 is premarked to indicate electrical conductivity in a normal range 19 and abnormal ranges 31 and 33.

The sample of milk to be tested is poured through a funnel 20 into a clear tubular plastic reservoir 22 supported in aperture 24 in bracket 21 and sealed in aperture 26 in bracket 23. Bracket 23 has a tubular extension 27 which forms the bottom of the reservoir and an electrode 40 is embedded in the bracket and forms a part of the inner surface of aperture 26. A cap 25 is pushed onto the tubular extension to close the bottom of the reservoir. The reservoir can be easily cleaned by removing cap 25 from the bottom of the tubular extension.

The temperature of a sample of milk poured into the reservoir is indicated on a bulb type thermometer 28 supported in aperture 30 in bracket 21 and sealed in aperture 32 in bracket 23. The bulb 34 of the thermometer extends into the tubular extension 27 which forms the base of the reservoir so that the thermometer responds to the temperature of the milk as soon as it is poured into the reservoir.

It is known that the electrical conductivity of a sample of normal milk at a given temperature will be substantially constant and that this conductivity will increase or decrease as the temperature of the sample increases or decreases. To compensate for this change in conductivity the distance between the electrodes is increased or decreased to maintain the conductivity approximately the same. In the present device the spaces between the degrees of the temperature scale on the thermometer have been made equal to the increase in the space between the electrodes in the reservoir required to maintain the conductivity of a sample of normal milk approximately constant for each degree change in temperature of the sample. Once this spacing has been determined, the same thermometer can be used with any reservoir having the same internal diameter as part of the combination of means for adjusting the test device to compensate for changes in temperature in the sample being tested, accurate measurements can be made with the tester using a ½ inch inside diameter reservoir and a six inch long thermometer having a ¼ inch outside diameter and a temperature scale of 30 through 95° covering 3½ inches of the length of the thermometer.

The electrical conductivity of the sample of milk in the reservoir is determined by passing a direct current between fixed electrode 40 and movable electrode 46. These electrodes form the remaining part of the combination of means for adjusting the test device. The electrodes should be made of an electrically conductive nonmagnetic material and can be made of such material as stainless steel, platinum, carbon graphite or the like. Stainless steel is preferred because of its low cost. The movable electrode 46 is secured to one end of an electrically conductive tube 48 with the tube being bent so that the other end is mounted for sliding motion on a fixed electrically conductive guide 52 located on the side of the housing in close proximity and parallel to the thermometer. An insulated coating 51 is applied to the major portion of the tube and guide. A fluxible or leaf spring type contact is secured to the guide and bears gainst the inner surface of the tube to provide a positive
lectrical contact as well as a slight frictional contact
o hold the tube in position on the guide. The spacing
etween the electrodes is adjusted by moving the tube up
r down on the guide.

The lower end 50 of the tube 48 is used as a reference
oint or member and is aligned with the temperature
ndicated on the temperature scale on the termometer.
This adjustment can be made almost immediately after
he reservoir has been filled since the bulb of the thermometer is located in the base of the reservoir.

The conductivity of the sample of milk in the reservoir is indicated by the conductivity meter 16 connected
nto the resistance bridge circuit 58. Electrode 40 is
onnected into the circuit by line 59 and electrode 46
hrough tube 48, guide 52 and line 61. The bridge circuit shown includes a variable resistance 60 in line 62
nd equal resistances 64 and 66 in lines 65 and 67, respectively. The conductivity meter 16 is connected across
he circuit by line 68 and a variable resistance 69 connected in parallel with the meter by lines 71 to reduce
he sensitivity of the meter if necessary. The bridge
ircuit is connected to a 110 volt power source by means
f a line 70, semi-conductor rectifier 72, line 74 and a
ine 76. A capacitor 78 is connected across lines 74 and
76 and a switch 80 is provided at the power source. The
ircuit should be connected with the movable electrode
ositive. The adjustable resistor 69 is preset at the plant
o balance the circuit so that the meter will indicate the
ormal range for normal milk at a given temperature. As
he temperature changes from the given temperature the
ube 48 will be moved up or down on the guide until the
eference end 50 is aligned with the temperature indicated
by the temperature scale on the thermometer. The testing
device should be cleaned after each two or three tests and
he movable electrode wiped clean.

What is claimed is:

1. In a milk testing device having a pair of electrodes positioned in a reservoir and connected to an electrical circuit which includes a conductivity meter for indicating whether a sample of milk in the reservoir is normal or abnormal, the improvement comprising the combination therewith of means for adjusting the space between the electrodes to compensate for temperature differences in the milk comprising a thermometer mounted to respond to the temperature of the milk in the reservoir and having therein a temperature scale including indicia spaced at predetermined intervals, one of said electrodes being mounted for movement in the reservoir and including a reference member movable relative to said scale in response to movement of said movable electrode including an electrically conductive guide positioned in a parallel relation to said thermometer and wherein said one of said electrodes comprises an electrically conductive U-shaped tube, said tube being mounted for sliding motion on said electrically conductive guide.

2. A milk testing device comprising a support, a reservoir mounted on said support and having predetermined internal dimensions, a thermometer mounted on the support and extending into said reservoir, said thermometer having thereon a scale including indicia calibrated in accordance with the internal dimensions of said reservoir, a fixed electrode positioned near the bottom of said reservoir, an adjustable electrode positioned for movement within said reservoir relative to said fixed electrode, said adjustable electrode including a reference member movable therewith for alignment with the indicated temperature on said thermometer, and an electrical circuit indicating means connected to said electrodes for indicating the conductivity of the milk wherein said adjustable electrode includes a U-shaped electrically conductive tube having one end movable within the reservoir and the other end movable with respect to said indicated temperature on the thermometer.

References Cited

UNITED STATES PATENTS

| | | | |
|---|---|---|---|
| 1,734,342 | 11/1929 | Perry | 324—30 |
| 2,680,834 | 7/1954 | Burns et al. | 324—30 |
| 2,769,140 | 10/1956 | Obenshain | 324—30 |
| 2,837,271 | 6/1958 | Haglund | 324—30 X |

RUDOLPH V. ROLINEC, Primary Examiner

C. F. ROBERTS, Assistant Examiner